Patented Jan. 9, 1934

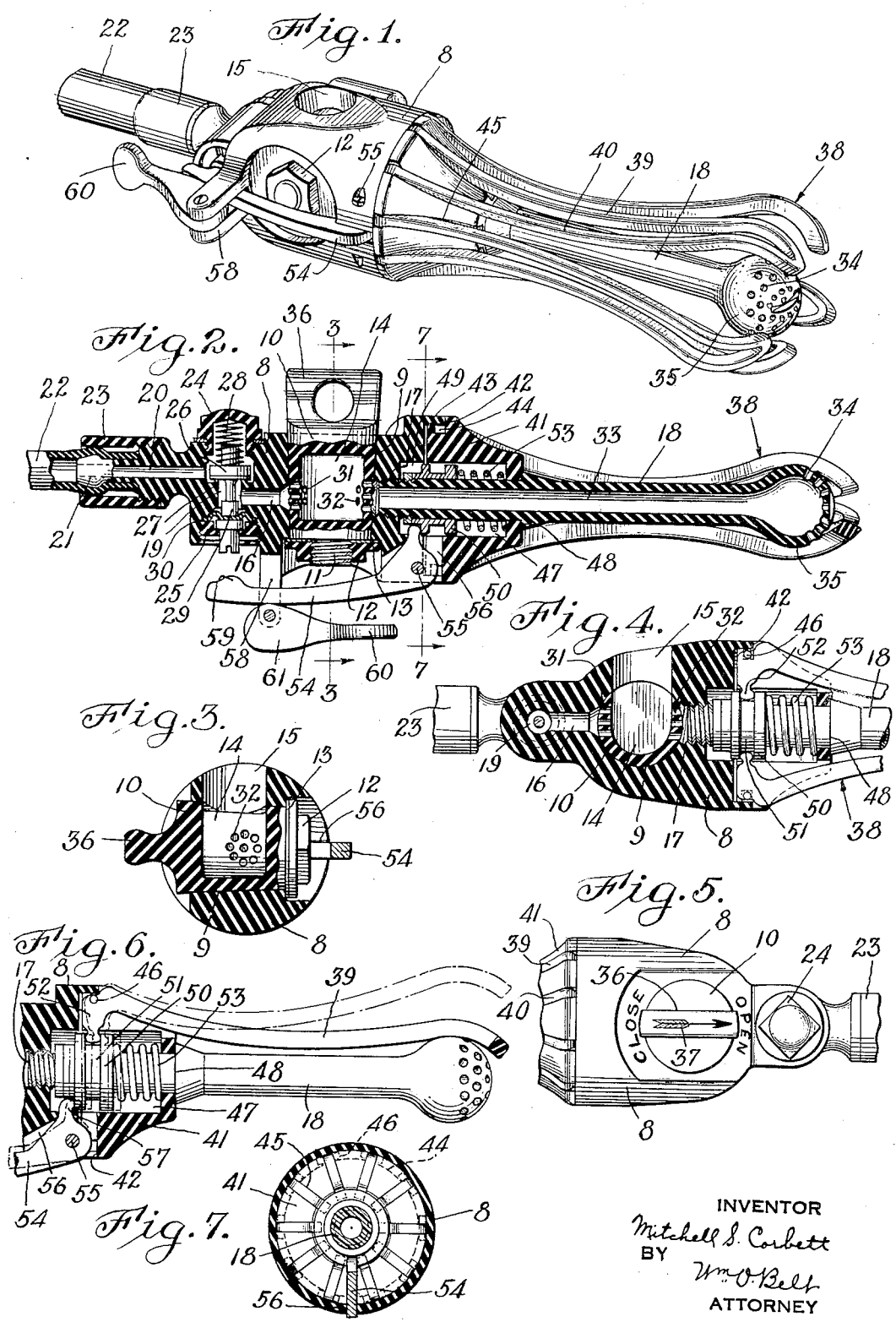

1,943,110

UNITED STATES PATENT OFFICE 1,943,110

VAGINAL DOUCHE

Mitchell S. Corbett, Chicago, Ill.

Application September 10, 1932
Serial No. 632,570

5 Claims. (Cl. 128—239)

This invention relates to improvements in vaginal douches of the kind adapted for antiseptic and hygienic usage.

One of the objects of my invention is to provide a novel light weight vaginal douche of economical construction and simple and efficient operation.

Another object is to provide a douche from which water under pressure is emitted at the inner part of the organ into which the douche is inserted and which includes distendable portions for dilating the organ so as to increase the effectiveness of the flow of water. An ancillary object is to provide a common control for the flow of water and the distendable portions.

Further objects are to provide a chamber in the douche wherein a soluble antiseptic substance may be stored to be dissolved by the water flowing through the douche and to facilitate introduction of the substance into the chamber.

Other and further objects are set forth in the following description, wherein reference is made to accompanying drawing, showing a selected embodiment of the invention, and in which Fig. 1 is a perspective view;

Fig. 2 is a longitudinal sectional view;

Fig. 3 is a vertical transverse sectional view taken substantially on the line 3—3 on Fig. 2;

Fig. 4 is a fragmentary horizontal transverse sectional view;

Fig. 5 is a fragmentary top plan;

Fig. 6 is a fragmentary detail sectional view; and

Fig. 7 is a view taken substantially on the line 7—7 on Fig. 2.

In the preferred form of construction shown in the accompanying drawing, 8 is a cylindrical body which may be made of a phenolic condensate material or the like and which has a diametrically extending tapered opening 9 therein. In the opening 9 is a tapered plug 10 having a screw-threaded projection 11 at the smaller end thereof engaged by a nut 12 to secure the plug 10 in the opening 9, a washer 13 being interposed between the nut 12 and the adjacent portion of the body 8 to permit free rotation of the plug in the opening without unloosening the nut. By tightening the nut, the tapered plug is drawn into the tapered opening to insure a snug fit and by tightening the nut from time to time wear may be taken up. In the plug 10 is a chamber 14 which opens through one side of the plug. In the body 8 is an opening 15 and by rotating the plug 10 communication may be established between the opening 15 and the chamber 14. The plug 10 may also be so rotated that this communication is interrupted and the chamber is then closed by the adjacent portion of the wall of the opening 9.

In the body 8 on opposite sides of the opening 9 are passages 16 and 17, the passage 17 being screw-threaded to receive one end of a stem 18 which projects from the body. The passage 16 leads to a valve chamber 19 in the body. A passage 20 leads from the valve chamber through a shouldered boss 21 extending from one end of the body. The end of a rubber hose 22 or the like is passed over the shouldered boss 21 and a retaining collar 23 is screw-threaded onto the adjacent portion of the body to secure the hose against displacement. Opposite ends of the valve chamber 19 are respectively closed by nuts 24 and 25. A valve member 26 is urged into engagement with a valve seat 27 in the chamber 19 by a spring 28 extending between a boss on the valve member and the nut 24. The stem 29 of the valve member 26 is passed through a diaphragm 30 in a manner which prevents leakage and the stem is freely extended through the nut 25. The nut 25 retains the diaphragm in position to prevent leakage from the valve chamber. Two groups of holes 31 and 32 are provided on opposite sides of the chamber 14 in alignment with the passages 16 and 17. The hose 22 is connected to a source of warm water under pressure and when the valve stem 29 is forced inwardly as, for example, in the manner to be described hereinafter, the valve member 26 disengages the valve seat 27 and water flows from the hose 22 through the passage 20, chamber 19, and passage 16 through the holes 31 into the chamber 14 and out through the holes 32 into a passage 33 in the stem 18 and is discharged through the perforations 34 in the bulb-like end 35 on stem 18 which provides a discharge nozzle.

As shown in Fig. 4, at the time the chamber 14 is in communication with the opening 15 the openings 31 and 32 are in alignment with the adjacent passages. Consequently, if water were permitted to flow into the chamber 14 at this time, it would escape through the opening 15. To avoid this the handle 36 on the plug 10 is provided with suitable indicia, such as the arrow 37. I also provide suitable indicia such as the words "Open" and "Close" on the body 8 at opposite sides of the plug 10. At the time the arrow 37 points toward the word "Open" the plug 10 is so arranged that the chamber 14 is out of communication with the passage 15 and consequently water escapement from the chamber is prevented but at the time the arrow 37 points toward the word "Close" the chamber 14 is arranged in the manner illustrated in Fig. 4 and when it is so arranged a soluble antiseptic substance, which may be conveniently made in the form of a tablet, is introduced into the chamber 14. Hence, when water escapement from the chamber 14 is prevented and a flow of water therethrough is established, the water dissolves the antiseptic substance and is thereby rendered antiseptic, the advantage of which is readily apparent in devices of this kind.

The effectiveness of the douche is greatly increased if the organ into which it is inserted is dilated as this tends to smooth the walls of the organ. To this end I provide distending members 38, each of which in the present instance includes two limbs 39 and 40 interconnected and rounded at their outer ends to neatly embrace the bulb-like end 35 when collapsed. A substantially frusto-conical retaining member 41 is provided which has a ring-like portion thereon providing a shoulder 42, beyond which shoulder is an annular boss 43 of less diameter than the ring-like portion providing the shoulder 42 and this annular boss is adapted to be fitted into a recess in the end of the body 8. In the periphery of the annular boss 43 is a groove 44. The conical portion of the retaining member 41 has slots 45 formed therein which extend through the ring-like portion providing the shoulder 42 and open into the groove 44. At the inner ends of the limb portions 39 and 40 are pins 46 and when the limb portions are arranged in the slots 45 the pins 46 are disposed in the groove 44 and provide fulcrums for the distending members. A chamber 47 is provided in the retaining member 41 and the stem 18 extends through this chamber. A shoulder 48 is formed on the stem 18 which engages the outer end of the retaining member 41 and when the stem 18 is screw-threaded into the passage 17 the shoulder 48 engages the end of the retaining member 41 and forces the shoulder 42 into engagement with the end of the body 8. The periphery of the annular boss 43 is then surrounded by the wall of the recess at the end of the body 8, into which the annular boss is extended, and this closes the groove 44 and prevents displacement of the pins 46 therefrom. A chamber 49 is provided in the body 8 in alignment with the chamber 47 and the means for moving the distending members 38 away from the stem 18 are arranged in these chambers and are adapted to slide on the stem 18. This means includes a collar 50 having a peripheral groove 51 therein in which the ends of radially extending lugs 52 at the inner ends of the limbs 39 and 40 are disposed. A spring 53 is disposed about the stem 18 in the chamber 47 and extends between the end of the member 41 and the collar 50 and acts on the collar to normally urge the distending members 38 toward the stem 18 and into the position in which these parts are shown in Fig. 2. However, when the collar 50 is slid along the stem 18 to compress the spring 53 the distending members are moved outwardly into a position substantially similar to that shown in Fig. 1 and illustrated in broken lines in Fig. 6.

To effect this movement of the collar 50, a lever 54 is provided which is pivotally mounted at 55 in a slot 56 in the member 41 and this lever includes a nose 57 which engages the collar 50 on the side thereof opposite that engaged by the spring 53. The lever 54 includes a portion which extends substantially parallel with the body 8 and this portion projects through a bifurcated lug 58 on the body 8. A boss 59 is provided on the lever 54 in alignment with the valve stem 29. Mounted in the bifurcated lug 58 is an operating member 60 including a cam portion 61. Until it is desired to expand the distending members 38 the operating member 60 is disposed in a position somewhat like that illustrated in Fig. 2 with the less eccentric part of the cam portion thereof in engagement with the lever 54. However, after the douche has been inserted and it is desired to bring about operation, the operating member 60 is pivoted to engage the more eccentric part of the cam portion 61 with the lever 54 which pivots the lever toward the body 8 and causes the collar 50 to slide along the stem 18 to effect expansion of the distending members 38 and at the same time the boss 59 is forced into engagement with the valve stem 29 unseating the valve member 26 and permitting the water to flow through the douche, the antiseptic tablet having previously been introduced into the chamber 14 and the handle 36 arranged in the position illustrated in Fig. 5. The cam portion 61 is so shaped that the operating member 60 may be locked in the last described position which is illustrated in Fig. 1. Consequently, the user need not hold the operating member 60 to keep the device in operative condition. When the operating member 60 is pivoted back into a position somewhat like that illustrated in Fig. 2, the lever 54 is permitted to reassume the position shown in Fig. 2, the spring 28 effecting this, and at the same time the spring 28 unseats the valve stem 29 to shut off the flow of water.

The body 8 and the plug 10 may be conveniently made of a phenolic condensate material which reduces the weight of the douche. The metallic parts such as the distending members 38 and the operating means may be conveniently made of a non-corrosible metal. It is clear that by merely rotating the plug 10 an antiseptic tablet may be easily introduced into the chamber 14, after which the chamber 14 may be closed to prevent water escaping by simply rotating the plug in the manner described. The operation is controlled by a single member which may be locked in operative position and consequently the use of the device is facilitated.

I have illustrated and described a selected embodiment of my invention but it is to be understood that this is capable of variation and modification and I therefore do not wish to be limited to the precise details set forth but desire to avail myself of such changes and alterations as fall within the scope of the following claims:

I claim:

1. In a device of the class described, a discharge nozzle, distending means, valve means controlling flow to said discharge nozzle, expanding means for said distending means, and operating means including independent portions for simultaneously operating said valve means and expanding means.

2. In a device of the class described, a discharge nozzle, distending means, yieldable means urging said distending means into a retracted position, means for expanding said distending means against the action of said yieldable means, valve means independent of said expanding means and, controlling flow to said discharge nozzle, means including a common member having independent portions for operating said expanding means and said valve means, and means for retaining said common member in predetermined positions and regulating the operation of said independent portions.

3. In a device of the class described, a body, a stem extending from said body and having a discharge nozzle at the end thereof, distendable members extending along said stem, means pivotally connecting the inner ends of said distendable members to said body, operating means for expanding said distendable members away from said stem, a valve in said body controlling water flow through said passage, and an operating member mounted on said body and including independent portions adapted for cooperation with said operating means and said valve and operable to simultaneously open said valve and effect expansion of said distendable members.

4. In a device of the class described, a body, a stem extending from said body and having a discharge nozzle at the end thereof, distendable members extending along said stem, means pivotally connecting the inner ends of said distendable members to said body, operating means for expanding said distendable members away from said stem, a valve in said body controlling water flow through said passage, an operating member mounted on said body and including independent portions adapted for cooperation with said operating means and said valve and operable to simultaneously open said valve and effect expansion of said distendable members, and means mounted on said body and engageable with said operating member to effect operation thereof and including portions for holding said operating member in operating position.

5. In a device of the class described, a body having an opening therein and a bore extending therethrough on opposite sides of said opening, a plug in said opening and having a pocket therein opening through the side thereof, said plug having openings therein leading from said pocket and adapted for communication with said bore, said body having a second opening therein leading to the first opening, and means retaining said plug in the first opening for rotation therein whereby said plug may be turned to align the open side of said pocket with the second opening or to align the openings in the plug with said bore whereby water flowing through said bore flows through the pocket in said plug, said plug closing said second opening when the openings in the plug are in communication with the bore to prevent water flowing out through said second opening.

MITCHELL S. CORBETT.